United States Patent [19]

Germinario

[11] 4,341,376

[45] Jul. 27, 1982

[54] SANDWICH ASSEMBLING JIG

[76] Inventor: Roger Germinario, 124 Pleasant Ave., East Bridgewater, Mass. 02333

[21] Appl. No.: 228,751

[22] Filed: Jan. 27, 1981

[51] Int. Cl.[3] .............................................. B23Q 3/00

[52] U.S. Cl. .................................... 269/288; 269/291; 269/295; 83/762

[58] Field of Search .................. 269/87.2, 295, 289 R, 269/290, 291, 292, 288; 83/762-764, 466.1; 211/49, 50; 248/174; 206/224, 554, 557, 561; D7/43, 72

[56] References Cited

U.S. PATENT DOCUMENTS 920,345 5/1909 Kolodziej .......................... 269/291

2,652,087 9/1953 Turpin ................................ 83/762

FOREIGN PATENT DOCUMENTS 735446 8/1955 United Kingdom ................ 269/290

*Primary Examiner*—Robert C. Watson

*Attorney, Agent, or Firm*—James H. Grover

[57] ABSTRACT

A jig with multiple units each for assembling and slicing two sandwiches at a time has a base with four upstanding walls for each unit surrounding a generally rectangular volume shaped to receive two pairs of bread slices and a filling between each pair. At two diagonal corners of the walls there are narrow, aligned slits receiving and guiding a knife for slicing the two sandwiches into two symmetrical pairs of stacked halves. The other diagonal corners are relatively widely spaced to form finger accesses for gripping the sliced sandwiches. A hollow in the base at these other corners further facilitates finger access. A removable cutting slab lying between the walls permits lifting both sandwiches at once.

9 Claims, 4 Drawing Figures

SANDWICH ASSEMBLING JIG

BACKGROUND OF THE INVENTION

This invention relates to a jig for mass production assembly of sandwiches of the usual type having two or more slices of bread and a filling. One main problem with rapid production of sandwiches is in control of the filling, particularly leafy fillings such as lettuce. Lettuce if shredded and handled rapidly is very difficult to control and hold in the sandwich during assembly of the sandwich, slicing it into halves and moving it to a wrapping or container. Lettuce and other fillings fall to the floor and are wasted in great quantities.

It is the object of the present invention to provide a jig which confines the bread and filling of a sandwich during assembly, slicing in half and removal to a container.

SUMMARY OF THE INVENTION

According to the invention a sandwich assembling jig comprises a base having a planar surface, and walls upstanding from the base surface around a sandwich-shaped volume for receiving bread slices stacked upward from the base with a filling between each two slices, the walls having upright edges spaced apart to form a finger access opening to the sandwich volume to allow removing and holding the assembled sandwich with filling from the jig.

DRAWING

DESCRIPTION

Figure 1:
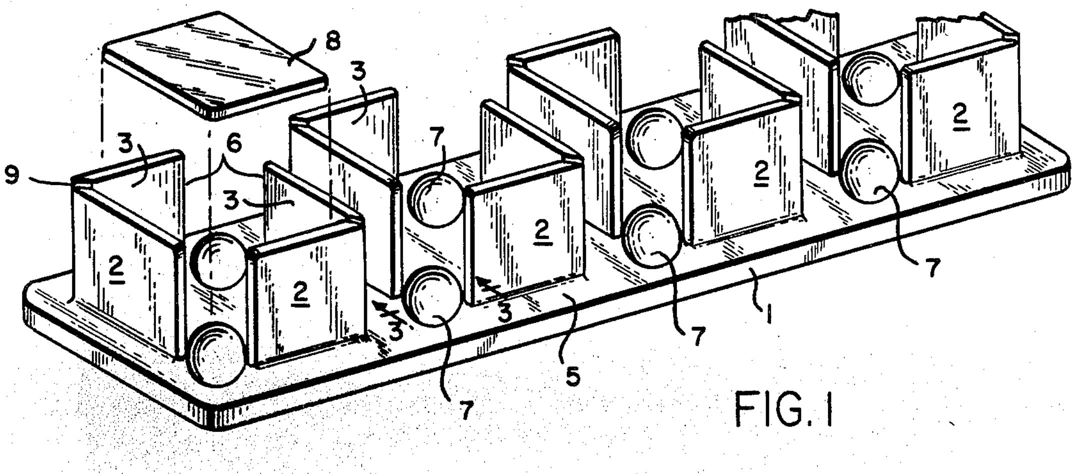
FIG. 1 is an isometric view of a sandwich assembling jig according to the invention.
Figure 2:
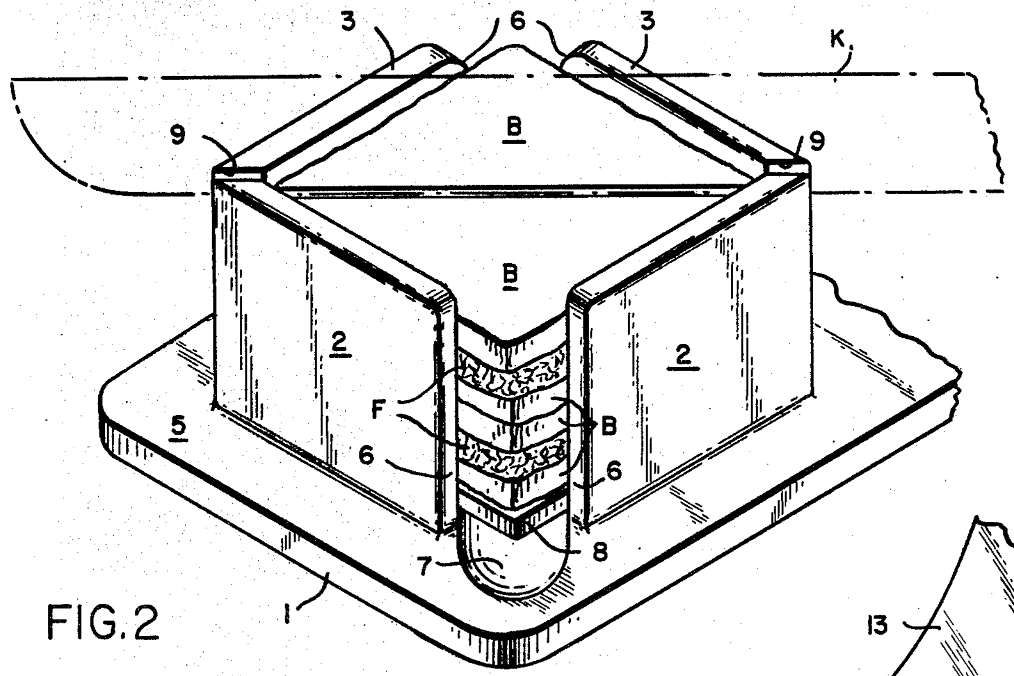
FIG. 2 is an enlarged, fragmentary isometric view showing assembly and cutting of a sandwich.
Figure 3:
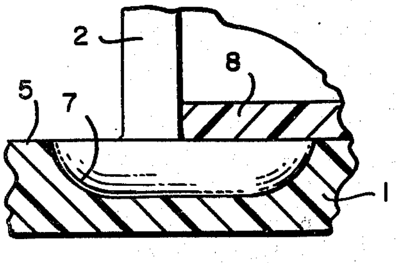
FIG. 3 is a section on line 3—3 of FIG. 1, enlarged.

The sandwich assembling jig shown in FIGS. 1 to 3 comprises a base 1 above whose upper planar surface 5 upstand four units or sets of four vertical walls 2 and 3. The base and walls may be formed of any suitable material, including wood, which has a non-porous, water and detergent insoluble surface. Plastics such as nylon and polyethylene are preferred for sanitation and durability. The base 1 provides a foundation for the sandwich, and each set of four walls 2, 3 surrounds and defines a generally rectangular, sandwich shaped volume for receiving rectangular bread slices B and a filling F between pairs of slices as shown in FIG. 2. The volume defined by the walls might be triangular, oval or other bread slice shape. Preferably the walls 2 and 3 extend high enough above the base surface 5 to accept two thicknesses of sandwich, that is, two pairs of bread slices B and two fillings F as shown in FIG. 2, this for reasons to be described hereinafter.

Each pair of adjacent walls 2,2 and 3,3 have relatively widely spaced upright edges 6 at diagonally opposite corners of the sandwich volume to form finger access openings 7 for gripping the top and bottom of a sandwich with the thumb and forefinger to allow removal of the sandwich with filling. Further to facilitate finger access hollows 7 are formed below the upper, planar surface 5 of the base. The hollows extend from outside the walls 2 under the sandwich volume between the walls 2,3 to allow finger access under the sandwich.

A rectangular cutting slab 8, of nylon for example, fits in the sandwich volume of each jig unit between the walls 2,3 and on top of the upper surface 5 of the base 1. The slab will then overlie part of the finger access hollow 7 as shown in FIG. 2. However, the slab will not prevent finger access in the hollow under the slab and under the sandwich.

At the corners of the walls other than the above described finger access corners and between adjacent walls 2,2 there are relatively narrow slits 9 between the closely spaced upright edges of adjacent pairs of walls 2,3. These diagonally opposed and aligned slits are adapted to receive and guide a knife K through the two superimposed sandwiches to cut them into two stacks each composed of two superimposed half sandwiches.

In preparing sandwiches a generally rectangular slice of bread is dropped to the bottom of each of the four sandwich units and then a layer of filling such as lettuce, meats and other vegetables is loaded on the bottom slice of bread, the filling being substantially completely confined by the walls 2,3 so that it is held in position on the bread and not wasted by falling on the floor. Two more slices of bread, a second like filling and a final top slice of bread are then loaded in each unit. The two superimposed uncut sandwiches are then cut diagonally in half by drawing a knife K through the cutting slits 9. Each superimposed pair of half sandwiches will then form a complete, triangular, stacked sandwich symmetrical with the other superimposed halves. If the cutting slab 8 is omitted each pair of sandwich halves can then be removed by inserting a finger in the access hollow 7 at the crusted, right angle corner of the halves, closing the thumb on the top of the stacked halves and lifting the two stacked halves out as a unit. The stacked sandwich halves may then be wrapped in any suitable way.

Figure 4:
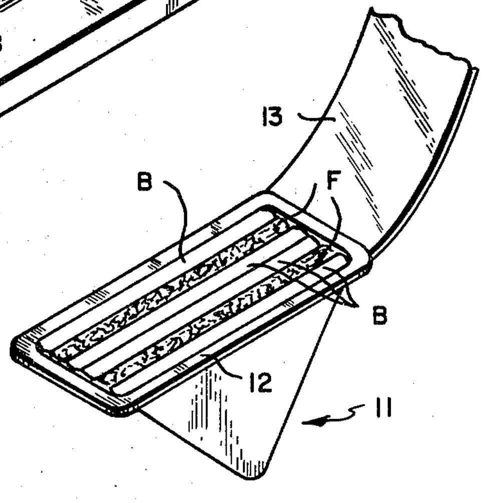
FIG. 4 is an isometric view showing two superimposed sandwich halves transferred to a triangular sandwich container.

The present jig is particularly useful with a known sandwich package 11 shown in FIG. 4. The package shown therein is formed of thin transparent plastic with walls forming a triangular cavity loosely fitting around a pair of triangular, stacked sandwich halves. A flexible sheet 13 of plastic can then be heat-sealed to a lip 12 around the cavity to enclose the sandwich halves completely.

Sandwiches are made and moved for wrapping more quickly and efficiently with less spilling if a cutting slab 8 is placed in each jig unit prior to loading and cutting a sandwich. A finger and thumb then grip the sandwich and the cutting slab and lift the slab and both pairs of sandwich halves on it from the jig. While still holding one pair of stacked sandwich halves on the slab the other pair may be easily slid from the slab into the triangular package of FIG. 4. Then the empty half of the slab may be gripped and the remaining pair of sandwich halves slid into another package.

It should be understood that the present disclosure is for the purpose of illustration only and that this invention includes all modifications and equivalents which fall within the scope of the appended claims.

I claim:

1. A jig for assembling sandwiches comprising:

a base having a planar surface, and walls upstanding from the base surface around a sandwich-shaped volume for receiving bread slices stacked upward from the base with a filling between each two slices, the walls having upright edges spaced apart to form a finger access opening to the sandwich volume to allow removing and holding the assembled sandwich with filling from the jig wherein four walls surround a generally rectangular volume with access openings formed at opposite corners of the walls and wherein other corners of the walls are spaced apart less than at the finger access corners to form aligned slits for receiving a knife to cut a sandwich in half diagonally.

2. A jig according to claim 1 wherein the walls extend high enough to accept two thicknesses of sandwich.

3. A jig for assembling sandwiches comprising:

a base having a planar surface, and walls upstanding from the base surface around a sandwich-shaped volume for receiving bread slices stacked upward from the base with a filling between each two slices, the walls having upright edges spaced apart a distance greater than a finger width to form a finger access opening to the sandwich volume to allow removing and holding the assembled sandwich with filling from the jig, wherein the base has a hollow at the opening below its surface extending under the sandwich volume for finger access under the assembled sandwich, the hollow communicating with the access opening to allow removal of the assembled sandwich while finger gripped.

4. A jig for assembling sandwiches comprising:

a base having a planar surface;

walls upstanding from the base surface around a sandwich-shaped volume for receiving bread slices stacked upward from the base with a filling between each two slices, the walls having upright edges spaced apart a distance greater than a finger width to form a finger access opening to the sandwich volume to allow removing and holding the assembled sandwich with filling from the jig; and a removable slab fitting in the sandwich shaped volume.

5. A jig according to claim 4 wherein the slab fits in the sandwich volume between the walls and on the base surface.

6. A jig for assembling sandwiches comprising a base with an upper planar surface, four walls upstanding from the base surface, the four walls surrounding a generally rectangular volume for receiving two sandwiches of two pairs of rectangular bread slices and a filling between each pair of slices, the walls being relatively closely spaced apart at two diagonally opposite corners to form vertical, aligned slits extending from the top of the walls to the base surface for receiving and guiding a knife to cut the two superimposed sandwiches into superimposed halves, the walls being relatively widely spaced apart at the two other diagonally opposite corners to form finger accesses to allow lifting two superimposed sandwich halves with filling out of the jig.

7. A jig according to claim 4 wherein four walls surround a generally rectangular, sandwich-shaped volume with access openings formed at opposite corners of the walls.

8. A jig according to claim 4 wherein four walls surround a generally rectangular, sandwich-shaped volume and wherein other corners of the walls are spaced apart less than at the finger access corner to form aligned slits for receiving a knife to cut a sandwich in half diagonally and wherein further the walls extend high enough to accept two thicknesses of sandwich.

9. A jig according to claim 4 wherein the slab is supported on the planar surface of the base and the base has a hollow extending under the slab below said surface to allow finger access under the slab for removal of the slab and the sandwich assembled thereon.

* * * * *